United States Patent
Perl et al.

[11] Patent Number: 5,920,593
[45] Date of Patent: Jul. 6, 1999

[54] DEVICE FOR PERSONAL DIGITAL CELLULAR TELEPHONES

[75] Inventors: Joseph Perl, Ra'anana; Doran Rainish; Ofer Elazar, both of Tel Aviv; Yona Leshets, Kiriat Haim; Omry Paiss, Tel Aviv, all of Israel

[73] Assignee: DSP Telecommunications Ltd., Givat Shmuel, Israel

[21] Appl. No.: 08/863,403

[22] Filed: May 27, 1997

Related U.S. Application Data

[63] Continuation of application No. 08/158,971, Nov. 29, 1993, abandoned.

[51] Int. Cl.$^6$ ........................................................ H04L 5/14
[52] U.S. Cl. .............................................. 375/222; 375/229
[58] Field of Search .................................... 375/216, 240, 375/222, 229; 379/93.01; 455/422

[56] References Cited

U.S. PATENT DOCUMENTS

| | | | |
|---|---|---|---|
| 3,997,847 | 12/1976 | Tong | 375/308 |
| 4,878,238 | 10/1989 | Rash et al. | 379/62 |
| 5,241,598 | 8/1993 | Raith | 455/33.3 |
| 5,333,176 | 7/1994 | Burke et al. | 379/58 |
| 5,485,522 | 1/1996 | Solve et al. | 381/56 |
| 5,528,666 | 6/1996 | Weigand et al. | 379/61 |

OTHER PUBLICATIONS

*Principles of Digital Communication and Coding*, by Andrew J. Viterbi and Jim Kay Omura, McGraw Hill, Tokyo, 1979, pp. 227–253.

*Theory and Practice of Error Control Codes*, Richard E. Blahut, Addison–Wesley, Massachusetts, 1983, pp. 130–141.

*Primary Examiner*—Tesfaldet Bocure
*Attorney, Agent, or Firm*—Kriegsman & Kriegsman

[57] ABSTRACT

A device useful in personal digital cellular (PDC) mobile telecommunications. The device is formed of an application specific integrated circuit (ASIC) chip and a digital signal processor (DSP) chip. The ASIC at least converts between digital modulated signals and analog ones. The DSP chip at least digitally modulates and demodulates the digital modulated and demodulated signals, digitally processes the demodulated signals to and from speech and control channel signals and performs vector sum excited linear prediction (VSELP) compression and decompression.

10 Claims, 10 Drawing Sheets

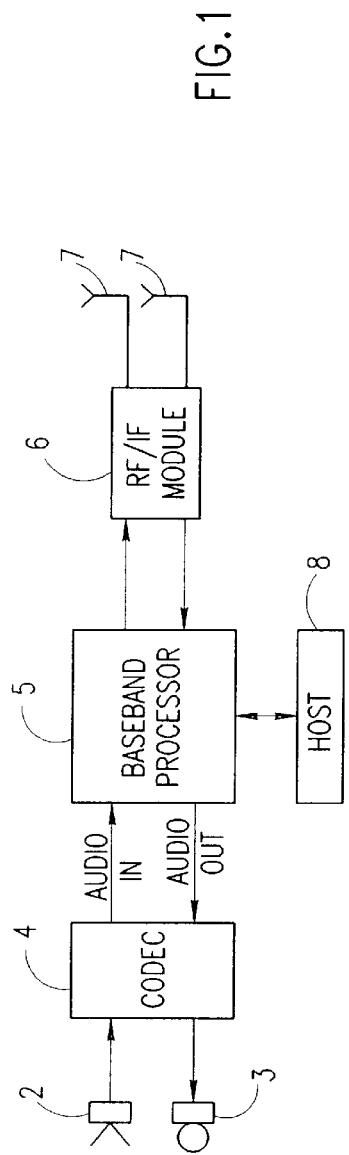
FIG.1
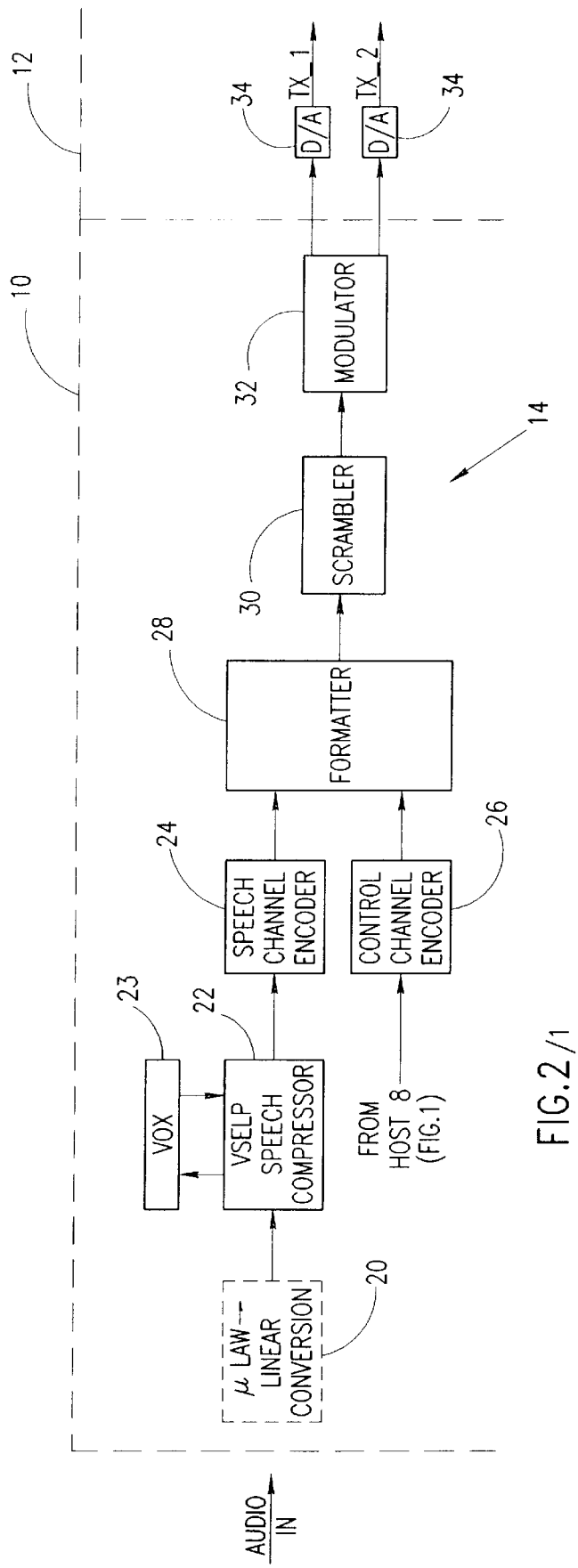
FIG.2/1

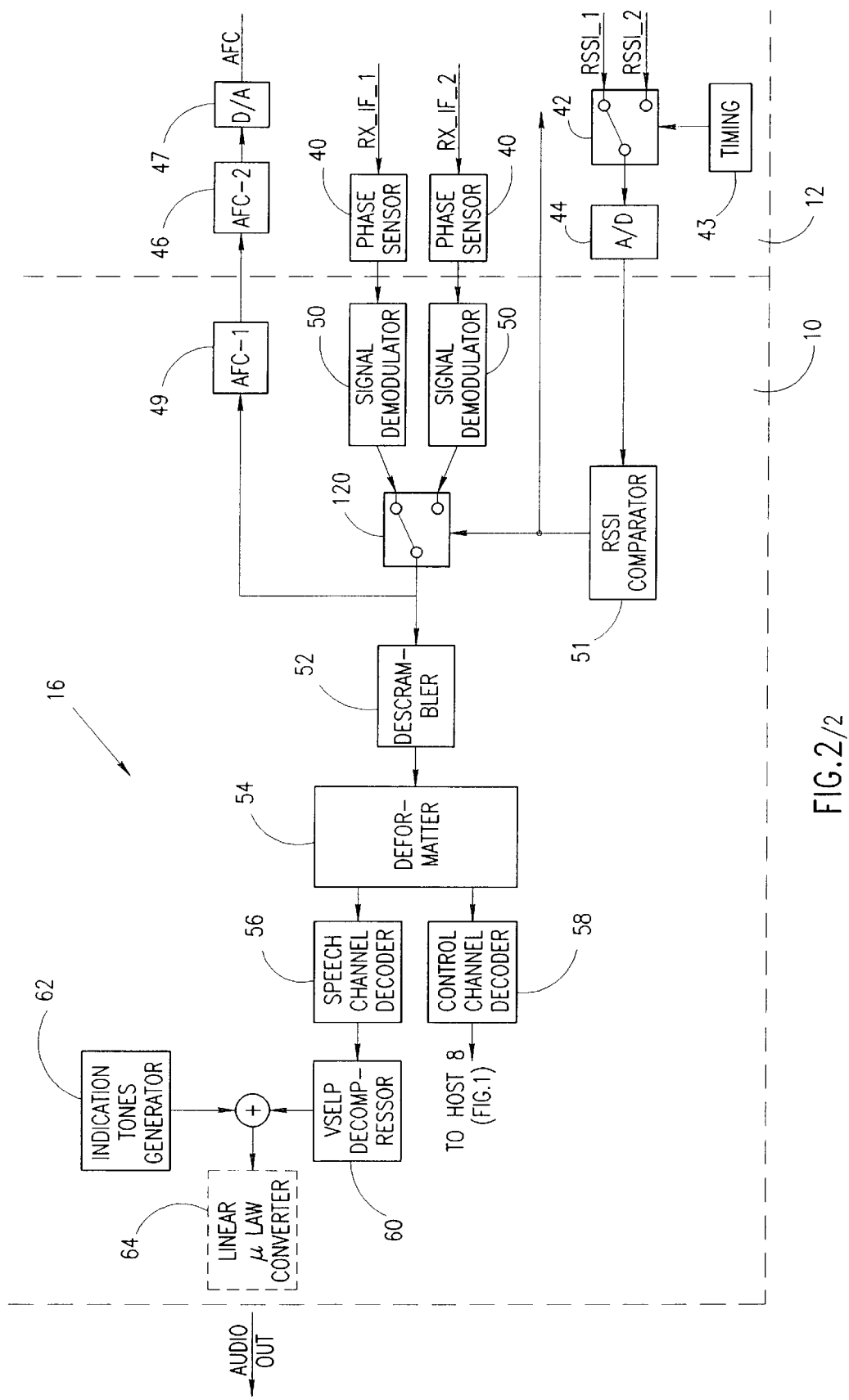
FIG.2/2

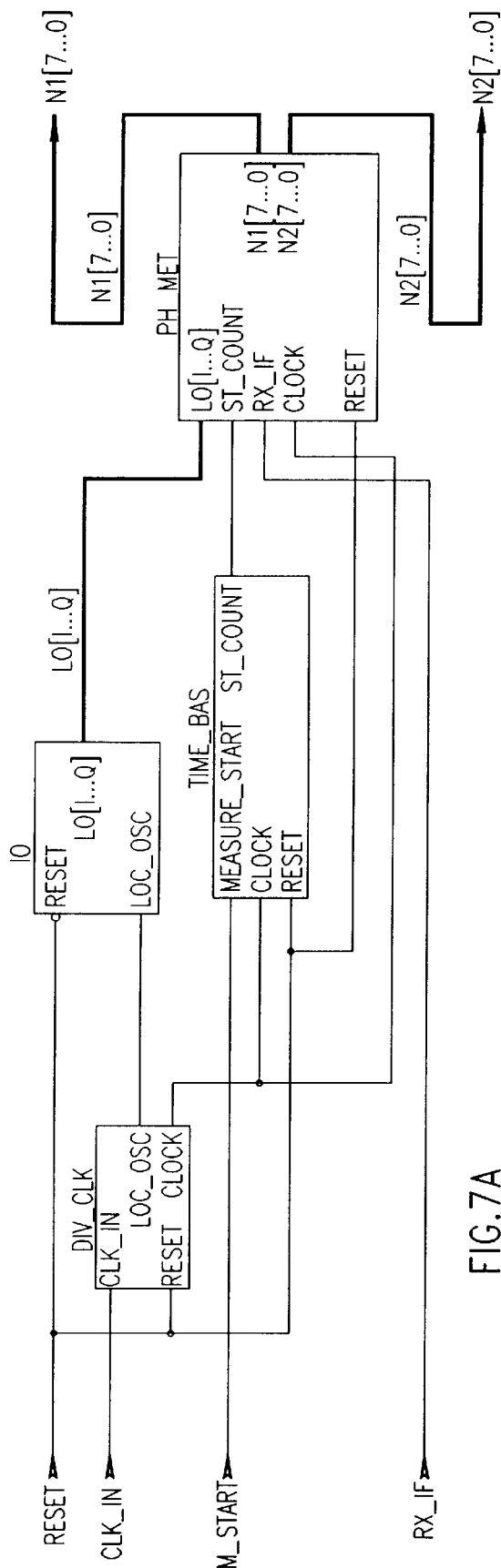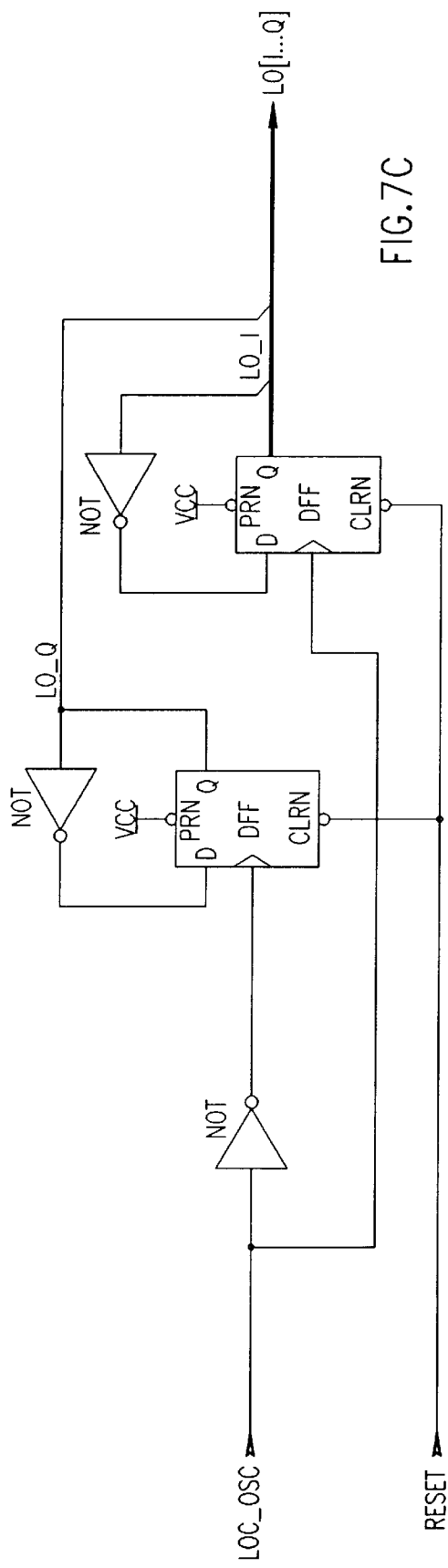
FIG. 7A
FIG. 7C

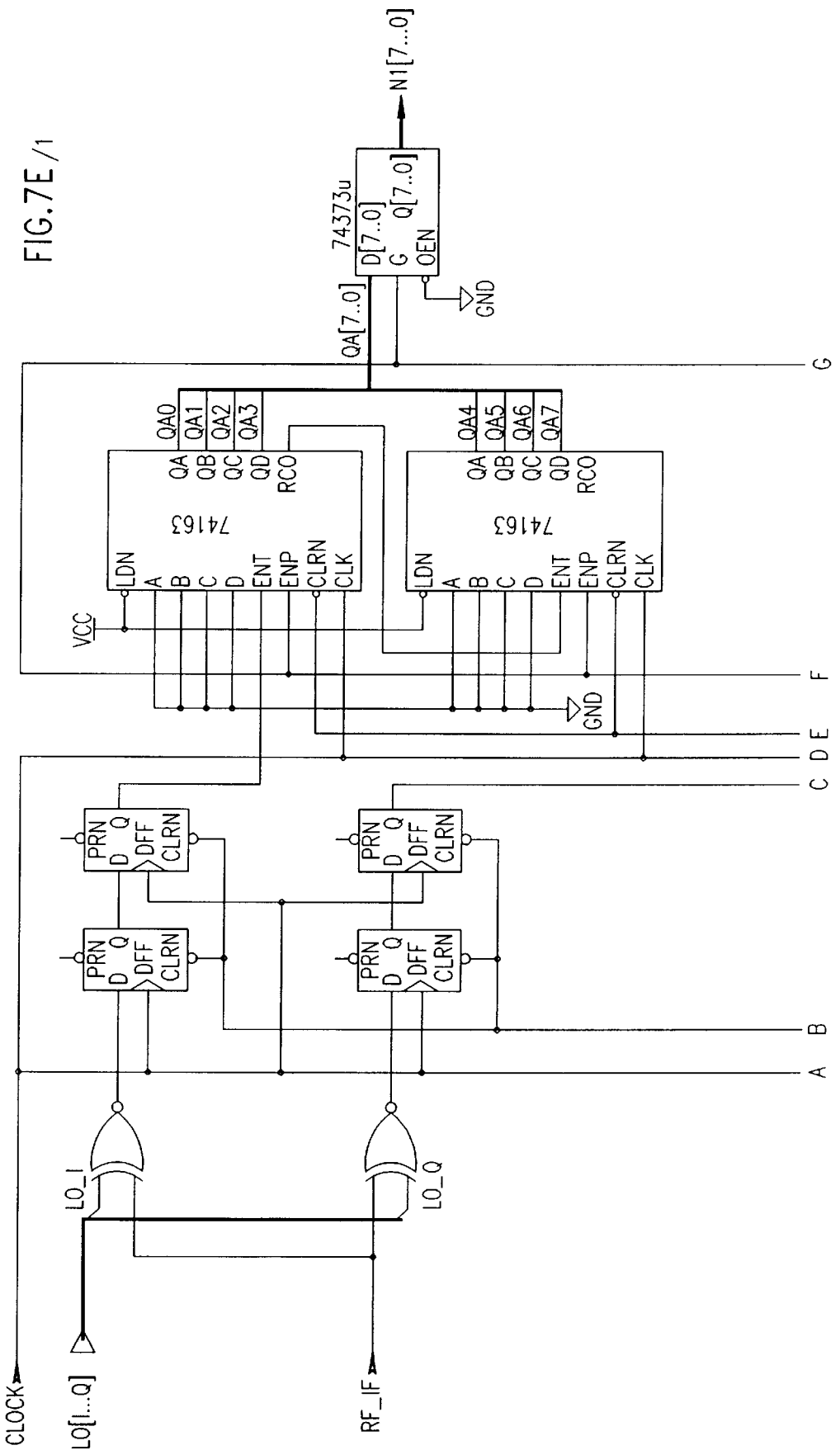
FIG.7E/1

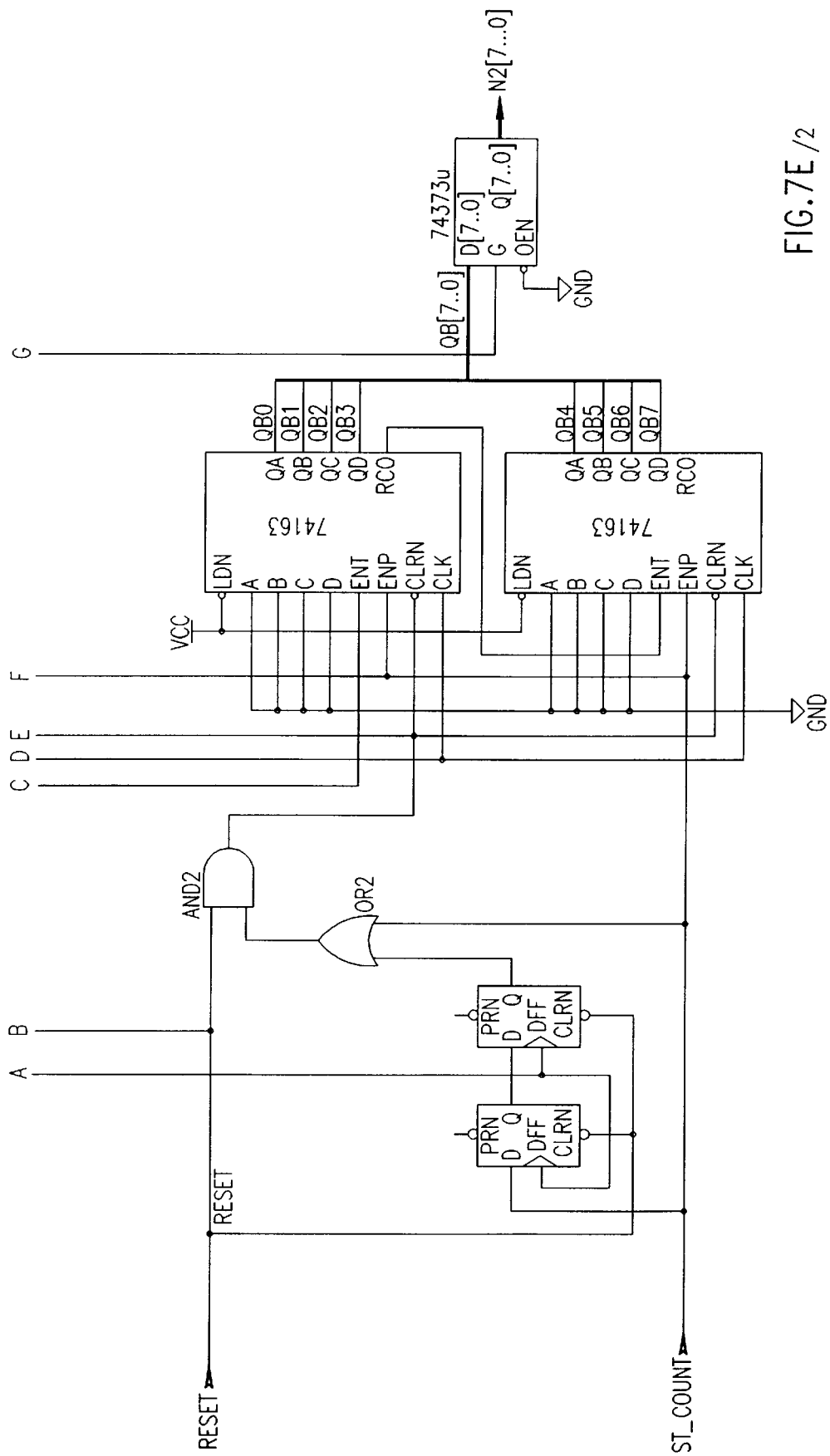
FIG. 7E /2

DEVICE FOR PERSONAL DIGITAL CELLULAR TELEPHONES

This application is a continuation of copending application Ser. No. 08/158,971 filed on Nov. 29, 1993, abandoned.

FIELD OF THE INVENTION

The present invention relates to devices for mobile telecommunication generally and to personal digital cellular (PDC) telephones in particular.

BACKGROUND OF THE INVENTION

The growing demand for mobile and portable telephone services has led to the creation of new standards for cellular phones. These standards, such as the European digital standard (GSM), the United States Digital Cellular (USDC) in North America and the Japanese Personal Digital Cellular (PDC) incorporate digital voice and Time Division Multiple Access (TDMA) protocols that enable a substantial increase in capacity, compared to the existing analog systems.

The standards are typically implemented in both hardware and software, wherein the software operates on a digital signal processing (DSP) chip and the hardware operates on a few application specific integrated circuit (ASIC) chips. On the transmitting end, the software typically compresses the speech signals received from a coder/decoder (CODEC) and the hardware prepares the compressed speech signals for transmission, adding error correction codes and control channel signals to the compressed speech signals and then modulating the resultant signal. On the receiving end, the hardware demodulates the received signals and processes them into compressed speech signals and control channel signals. The software then decompresses the speech signals and provides them to the CODEC.

SUMMARY OF THE PRESENT INVENTION

It is an object of the present invention to provide a baseband processor for personal digital cellular (PDC) telephones which utilizes little space and little power.

There is therefore provided, in accordance with a preferred embodiment of the present invention, a device useful in PDC telephones. The device is formed of an application specific integrated circuit (ASIC) chip and a digital signal processor (DSP) chip. The ASIC at least converts between digital modulated signals and analog ones. The DSP chip at least to and from speech and control channel signals.

Additionally, in accordance with a preferred embodiment of the present invention, the digital modulated signals are phase modulated signals and the ASIC chip includes a digital to analog converter for converting the digital modulated signals to analog ones and a phase identifier for digitally identifying phases in the analog modulated signal. Preferably, the DSP chip includes at least one signal demodulator for demodulating the phase signal. Moreover, the phase identifier comprises a local oscillator having a frequency of operation and wherein the frequency of operation is user-programmable.

Moreover, in accordance with a preferred embodiment of the present invention, the DSP chip additionally includes a digital parametrized control channel encoder and decoder.

Still further, in accordance with a preferred embodiment of the present invention, the DSP chip additionally includes a speech channel decoder implementing a Viterbi decoding scheme and a per bit projection metric.

Additionally, in accordance with a preferred embodiment of the present invention, the DSP chip includes a digital modulator for digitally modulating a signal to be transmitted and for ramping the modulated signal. The digital modulator preferably includes finite impulse response filters.

Moreover, in accordance with a preferred embodiment of the present invention, the DSP chip includes apparatus for performing post detection/selection, apparatus for performing antenna selection and apparatus for selecting between the two.

Finally, there is provided, in accordance with a preferred embodiment of the present invention, an indication tones generator including apparatus for receiving operator selected pole pair values located on the unit circle and marginally stable filters utilizing the pole pair values for generating sine waves of at least one predetermined frequency.

BRIEF DESCRIPTION OF THE DRAWINGS AND APPENDIX

The present invention will be understood and appreciated more fully from the following detailed description taken in conjunction with the drawings in which:

FIG. 1 is a block diagram illustration of a mobile telecommunications unit;

FIG. 2 is a block diagram illustration of a baseband processor constructed and operative in accordance with a preferred embodiment of the present invention, useful in the unit of FIG. 1;

FIG. 7A is a circuit diagram illustration of an implementation of the digital demodulator of FIG. 5; and FIGS. 7B–7E are circuit diagram illustrations of elements of the digital demodulator of FIG. 7A.

DETAILED DESCRIPTION OF A PREFERRED EMBODIMENT

Figure 3B:
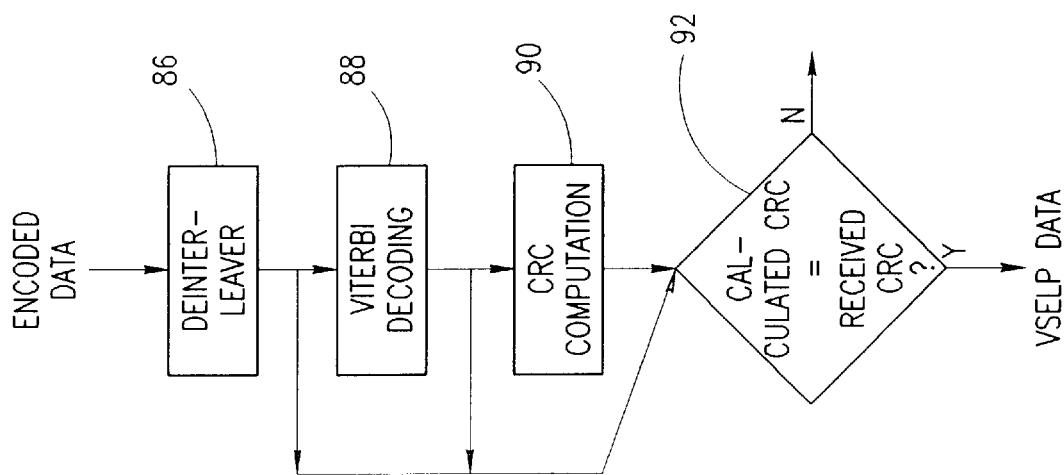
FIGS. 3A and 3B are flow chart illustrations of the operations of speech channel encoding and decoding, respectively.

Reference is now made to FIG. 1 which illustrates, in block diagram format, a mobile telecommunications unit. Reference is also made to FIG. 2 which illustrates, in block diagram format, a baseband processor forming part of the unit of FIG. 1, wherein the processor is constructed and operative in accordance with a preferred embodiment of the present invention.

The mobile telecommunications unit typically comprises a speaker 2 for incoming speech signals, a microphone 3 for outgoing speech signals, a coder/decoder (CODEC) 4, a baseband processor 5 for processing audio in and audio out signals received from the CODEC 4 and for performing baseband modem processing, a radio frequency/ intermediate frequency (RF/IF) module 6 connected to at least one antenna 7 for transmitting and receiving processed audio signals, and a host microprocessor 8 for controlling the operation of the baseband processor 5.

The baseband processor 5 is formed of a digital signal processor (DSP) chip 10 and an application specific integrated circuit (ASIC) chip 12 wherein, in accordance with the present invention, most of the operations of the block diagram of FIG. 2 are performed by the DSP chip 10.

The baseband processor 5 typically has at least two operational paths, a transmission path 14 for outgoing signals and a reception path 16 for incoming signals. The present invention will be described herein as part of an implementation of the PDC standard, RCR STD-27B which is incorporated herein by reference. It will be understood that the principles of the present invention are applicable to other standards as well.

Within the DSP chip 10, the transmission path 14 typically comprises an optional $\mu$-law-linear converter 20, a vector sum excited linear prediction (VSELP) compressor 22 with associated voice operated switch (VOX) 23, a speech channel encoder 24, a control channel encoder 26, a formatter 28, a scrambler 30 and a modulator 32. Within the ASIC 12, the transmission path 14 comprises two D/A converters 34.

If the CODEC compands the speech signal from the microphone 3, the optional $\mu$-law-linear converter 20 converts the companded speech signal back to a linear speech signal. The VSELP compressor 22 compresses the speech signal and provides the non-noise portions, as identified by the VOX 23, to the speech channel encoder 24. The speech channel encoder 24 encodes the compressed speech signal and the control channel encoder 26 encodes a control signal received from a host microprocessor (not shown). The formatter 28 receives the encoded signals from encoders 24 and 26 and adds to them formatting information, such as synchronization words, color codes and pre- and post-amble words. The scrambler 30 scrambles the formatted signal so that the transmitted signal will not be easily intercepted. The modulator 32 digitally modulates the scrambled signal, typically in accordance with phase modulation as is typical in mobile telecommunications.

The D/A converters 34 of the ASIC 12 typically convert the already modulated signal into an analog one and provide it to the RF/IF module 6.

Within the ASIC chip 12, the reception path 16 typically comprises at least one phase sensor 40, a signal selector 42 with its associated timing control unit 43 and an analog-to-digital (A/D) converter 44 for providing a digital value for the received signal strength indicator (RSSI) signal. The ASIC chip 12 also comprises a portion 46 of an automatic frequency control (AFC) unit and its associated D/A converter 47, to be described in more detail hereinbelow.

The phase sensor 40 provides phase values for samples in the incoming phase modulated signal and is described in detail hereinbelow U.S. patent application Ser. No. 08/272,221, entitled "Demodulator", assigned to the common assignees of the present invention U.S. patent application Ser. No. 08/272,221 was filed on Jul. 8, 1994 and claims priority from Israel Patent Application 107656, filed Nov. 18, 1993. Portions of U.S. patent application Ser. No. 08/272,221 describing FIGS. 5, 6, 7A, 7B, 7C, 7D and 7E, are included hereinbelow with the numbering changed. When indicated by the timing unit 43, the selector 42 selects one of two incoming RSSI signals, which signal is then converted to a digital signal by the A/D converter 44.

Within the DSP chip 10, the reception path 16 typically comprises a second portion 49 of the AFC unit, at least one signal demodulator 50, an RSSI comparator 51, a descrambler 52, a deformatter 54, a speech channel decoder 56, a control channel decoder 58, a VSELP decompressor 60, an indication tones generator 62 and an optional linear-$\mu$-law converter 64.

In accordance with U.S. patent application Ser. No. 08/272,221 and as described hereinbelow with respect to FIGS. 5, 6, 7A–7E, the signal demodulator 50 typically demodulates the phase values to the symbols they represent. The descrambler 52 descrambles the symbol signal. The deformatter 54 removes the formatting information from the descrambled signal, processes the information and provides the results to the host microprocessor 8. The deformatter 54 also splits the signal into speech and control channels which are then decoded by their respective decoders 56 and 58. The control signals are provided to the host microprocessor 8 and the speech signal, which is still VSELP compressed, is provided to the VSELP decompressor 60. The resultant speech signal is optionally provided to the linear-$\mu$-law converter 64 and the result is provided to the CODEC 4. If an indication tone, rather than or in addition to speech, should be produced, the tones generator 62 provides the desired sounds and they are added to the signal prior to optional conversion by the converter 64.

It will be appreciated that the DSP chip 10 processes the speech and control signals through modulation and most of demodulation. Furthermore, the DSP chip 10 also performs indication tones generation.

The VOX 23 is any suitable voice activity detector. The VSELP compressor 22 performs VSELP compression and code-book searching, utilizing a plurality of code-books, in accordance with the RCR STD-27B standard. The coded signal is then provided to the speech channel encoder 24.

Given a compressed speech signal, VSELP decompressor 60 uses the same code-books as the VSELP compressor 22 to convert the codes to the speech signal they represent.

The indication tones generator 62 is implemented with marginally stable digital filters. The user selects desired pole pairs located on the unit circle. Such filters produce sine waves at the required frequency. Most audible tones can be created with these filters and, with two pole pairs, the filters enable combinations of two tones (which produce dual tone multi-frequency (DTMF) tones).

Figure 3A:
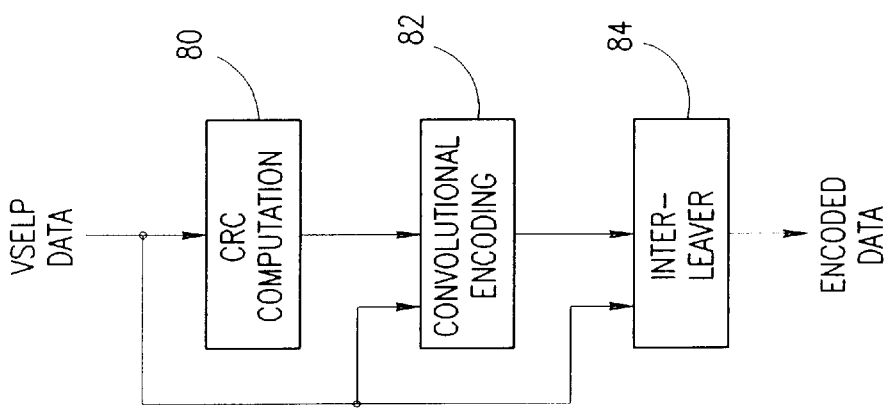

The speech channel encoder 24 encodes the compressed signal produced by the VSELP compressor 22. The speech channel decoder 56 performs the opposite operation of the speech channel encoder 24. Their operations are illustrated in FIGS. 3A and 3B, respectively, to which reference is now made. As is known in the art and defined in the standard RCR-27B, the VSELP data is divided into class 1 and class 2 datatypes.

For speech encoding, a cyclic redundancy code (CRC) computation is first performed on the most significant portions of the VSELP data (step 80) and the CRC code is concatenated to the class 1 bits of the VSELP data. In step 82, the class 1 bits and the CRC code are encoded according to a half rate punctured convolutional encoding scheme after which, the convolutional encoded data and the class 2 bits of the VSELP data are interleaved (step 84). The principles of operation of steps 80–84 are outlined in the standard RCR STD-27B and are discussed in the book *Principles of Digital Communication and Coding*, by Andrew J. Viterbi and Jim Kay Omura, McGraw Hill, 1979, which book is incorporated herein by reference.

For decoding, each segment of the data is first deinterleaved (step 86) and forward error correction (step 88), via a Viterbi decoding scheme, is then performed on the class 1 bits only. The Viterbi decoding scheme is described in the book *Principles of Digital Communication and Coding*, by Andrew J. Viterbi and Jim Kay Omura. Since the decoding scheme is performed on the DSP chip 10, the prior art hardware restrictions of word length and decoder memory length are eliminated.

The Viterbi decoding scheme utilizes soft metric calculations which, in accordance with the present invention, are performed per bit, rather than per symbol as in the prior art. In the present invention, a nearly maximum likelihood metric is utilized per bit.

In step 90, the CRC code concatenated to the class 1 bits is removed and stored and a CRC code is computed for the output of the Viterbi decoding step. In step 92, the new CRC code is compared with the stored CRC code. As defined in the RCR STD-27B standard, if the codes are equivalent, then the segment is provided to the VSELP decompressor 60. Otherwise, the segment is replaced by an attenuated version of the previous segment or the signal is muted.

Figure 4A:
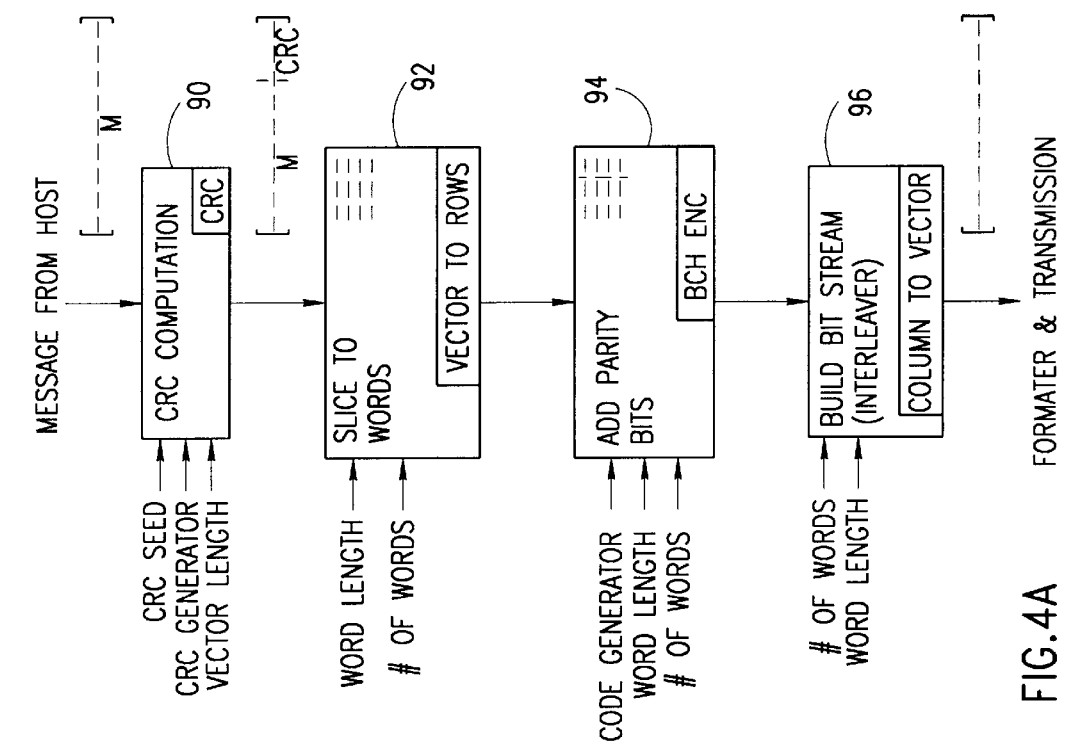
FIGS. 4A and 4B are flow chart illustrations of the operations of control channel encoding and decoding, respectively.
Figure 4B:
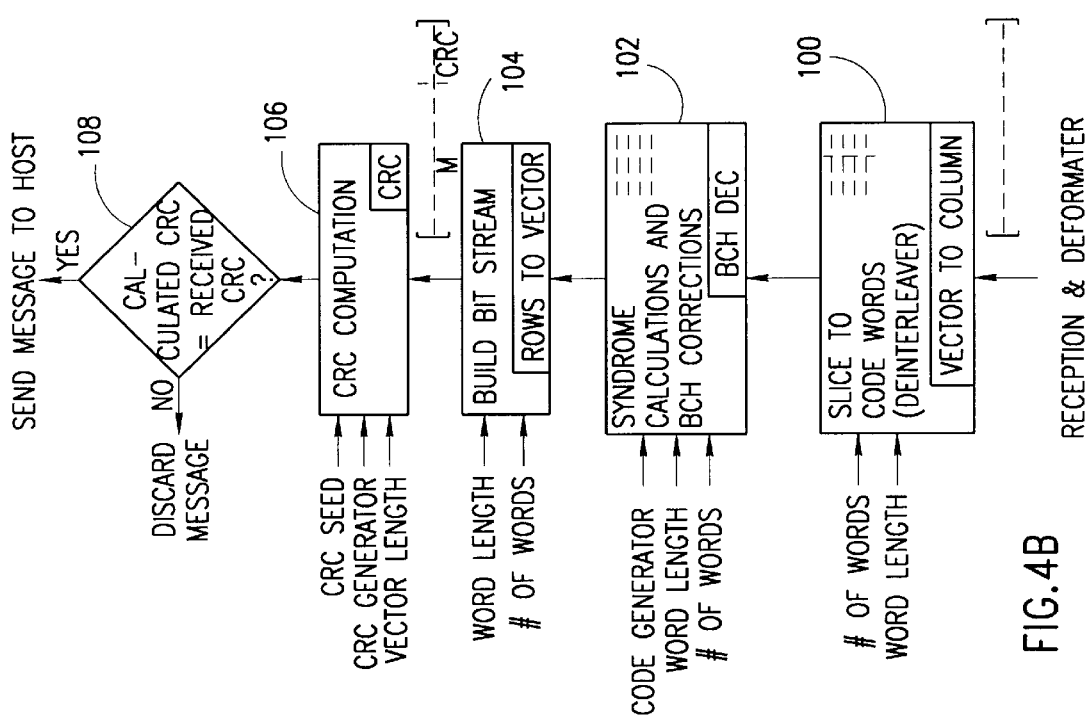

In accordance with the present invention, the control channel encoder 26 and decoder 58 are parametrized and operate in response to parameters received from the host microprocessor 8. Their operations, which are similar to those of the speech channel encoder and decoder, are outlined in FIGS. 4A and 4B, respectively, to which reference is now made.

The encoder 26 receives a segment of control data from the host microprocessor 8 and first performs a CRC computation (step 90, FIG. 4A) on it, wherein the CRC seed, generator and vector length are provided as parameters. Thus, the multiplicity of CRC codes which are typically utilized in a PDC unit are produced in a single unit.

The CRC code is added to the segment and the resultant combined segment is then divided (step 92) into words of a parametrized length and into rows having a parametrized number of words therein.

In step 94, BCH encoding is performed on each row to determine the values of parity bits to be added to the row. The values of word length, number of words and type of code generator are provided to step 94. BCH encoding is described in the book by R. E. Blahut, *Theory and Practice of Error Control Codes,* Addison-Wesley, 1983, which is incorporated herein by reference.

In step 96, interleaving, in which the data of a number of rows is read as columns, is performed. The values of the number of words per column and the word length are provided as parameters.

The channel decoder 58 performs the opposite operations to those of the encoder 26. Thus, the received data is first deinterleaved (step 100) and syndrome decoding is performed (step 102). The data is then rearranged (step 104) from rows to segments and the CRC code is removed. A CRC computation (step 106) is performed on the remaining data. Each of steps 100–106 is performed with the parameters utilized for encoding.

In step 108, the CRC code produced in step 106 is compared to that removed in step 104. If the codes are equivalent, then the decoded message is provided to the host microprocessor 8. Otherwise, the message is discarded.

Reference is now made back to FIG. 2. The scrambler 30 and descrambler 52 operate on the bits of their respective received signals. The units perform a bit-by-bit XOR operation between their received signals and a generated pseudo random bit stream.

Modulator 32 typically performs $\pi/4$-shifted differential quadrature phase shift keying (DQPSK) modulation and shaping and, in accordance with a preferred embodiment of the present invention, is implemented with two finite impulse response (FIR) filters. Modulator 32 produces two modulated signals. The RF/IF module 6 includes digital smoothing low pass filters for smoothing the output of the modulator 32.

In accordance with the present invention, the modulator 32 also performs digital ramping of the modulated signals. The digital ramping is typically more accurate than that possible when implemented as part of a radio subsystem. Furthermore, by implementing it within the DSP chip 10, the RF circuitry is simplified, as is the interface between the ASIC 12 and the RF/IF module 6.

The ramped signals are then converted to analog signals by the D/A converters 34 and provided to the RF/IF module 6.

Demodulation is performed by the signal demodulators 50 and the phase sensors 40. In accordance with the present invention, the incoming phase modulated signals are hard limited and the phase sensors 40 determine the values of the phases between the incoming signals and a locally produced signal whose intermediate frequency and phase are known. The signal demodulators 50 then compute the phase differences between neighboring samples and from that, determine the symbols they represent. In accordance with the present invention, the intermediate frequency of the locally produced signal is user-definable.

It will be appreciated that the interface between the speech and channel encoding and decoding and the modulation and demodulation functions is simplified compared to that of the prior art since the four functions all are implemented within the DSP chip 10. As a result, the present invention does not utilize the synchronization signals (e.g. clocks and frame synchronization) which are standard in the prior art.

Only one of the two received incoming signals is to be used at a given moment and the choice of a signal is based on the energy in each signal. The energy in each relative signal strength indicator (RSSI) signal over a given period, determined by the timing unit 43, is digitally computed by the RSSI comparator 51 and a select signal for the one with the largest energy is provided to a signal selector switch 120.

The AFC unit, comprised of portions 49 and 46, is operative to synchronize the frequency of operation with that of the incoming signal and to compensate for frequency errors of the RF/IF module 6. The first portion 49 receives the demodulated signal selected by switch 120 and roughly determines the frequency of the signal. Second portion 46 then refines the estimate and provides the computed value to the RF/IF module 6, via the D/A converter 47.

In order to enhance performance over fading channels, the RCR STD-27B standard specifies the use of space diversity. The baseband processor of the present invention supports two types of diversity, post detection/selection and antenna selection, which are user-selectable. The block diagram of FIG. 2 is operative for post detection/selection. For antenna selection, only one RF/IF path is needed. For this mode, only one phase sensor 40 and signal demodulator 50 are utilized. The RSSI comparator 51 determines which antenna has the most energy and provides a control signal to an antenna control switch (not shown) to select the appropriate antenna.

It will be appreciated that, because the DSP chip 10 processes the speech and control signals from the CODEC 4 and through the modulation/demodulation stages, the interfaces between functional units are generally simple.

Figure 5:
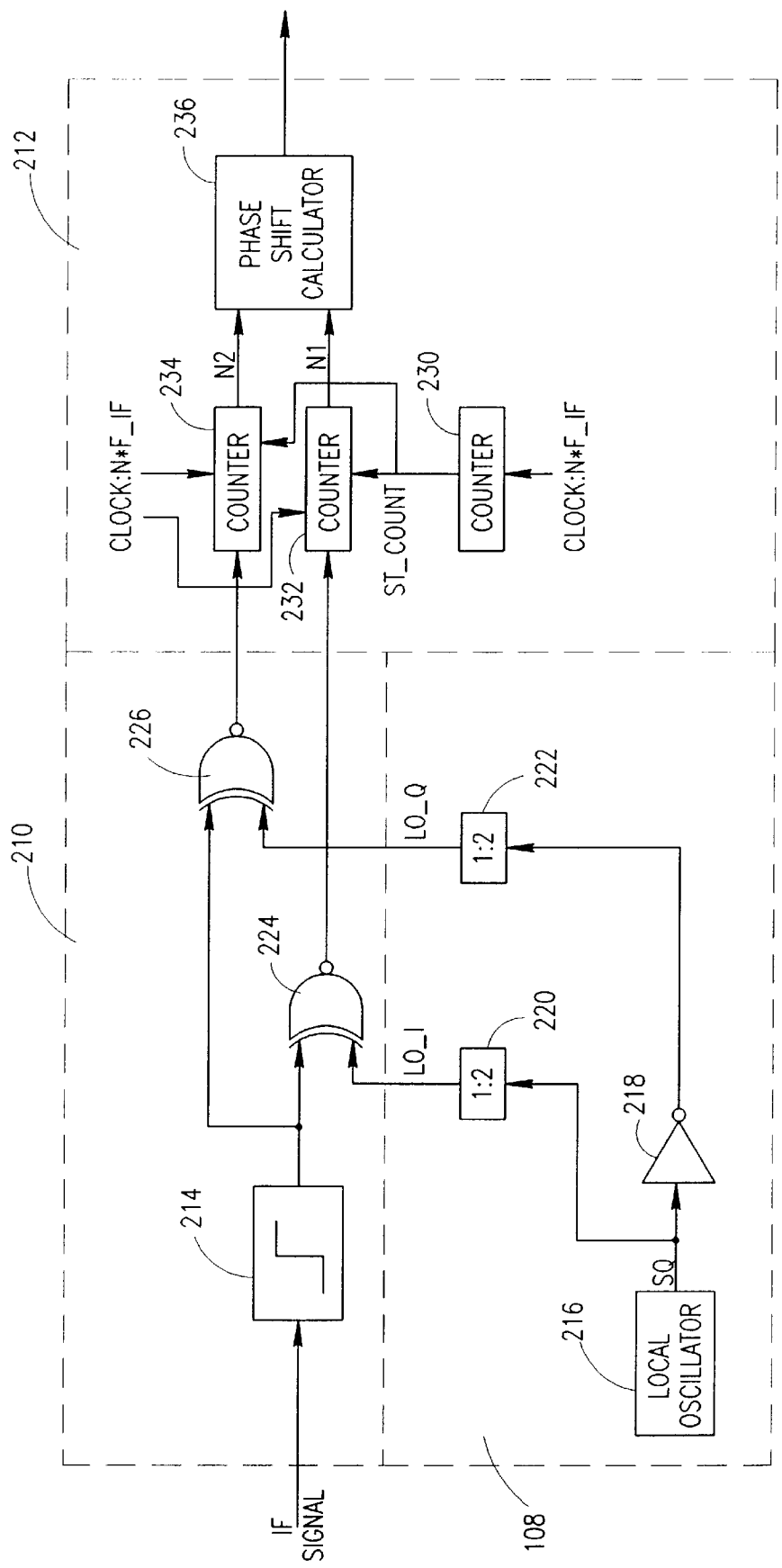
FIG. 5 is a schematic illustration of a low power digital demodulator useful in the baseband processor of FIG. 2.
Figure 6:
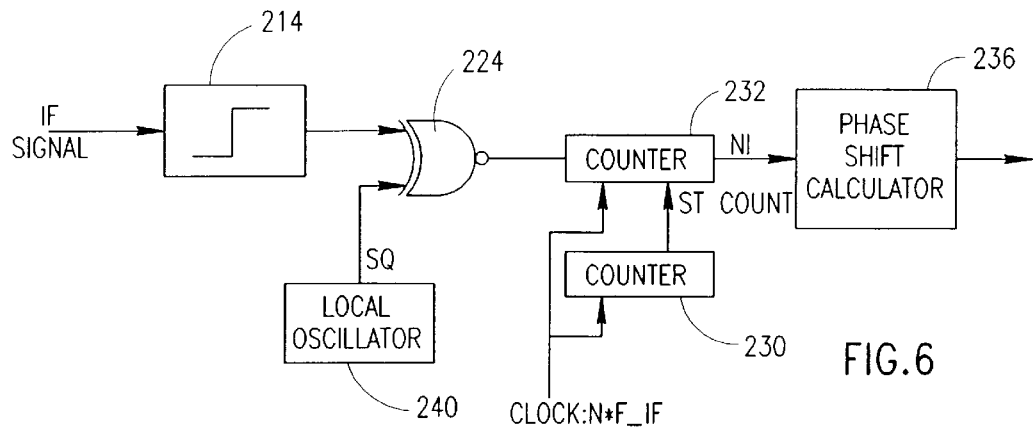
FIG. 6 is a schematic illustration of an embodiment of the demodulator of FIG. 5 useful for 2PSK modulated signals.

Reference is now made to FIGS. 5 and 6. FIGS. 6 illustrates a demodulator formed of the phase sensor 40 and the demodulator 50. FIG. 6 illustrates an alternative embodiment for 2PSK coherent demodulation.

The demodulator typically comprises a reference generator 208, a phase sensing unit 210 (forming phase sensors 40) and a phase shift determining unit 212. The reference generator 208 provides a reference signal at a base frequency of an input, analog, phase-modulated IF signal. The phase sensing unit 210 digitally senses the phase of the input IF signal with respect to the reference signal and the phase shift determining unit 212 determines the size of the phase shift, quantizing the phase shift to the levels desired by the modulation method.

Thus if M-ary differential phase shift keying (MDPSK) is utilized, the phase shift between consecutive symbols is determined by subtracting two consecutive phase measurements. If M-ary phase shift keying (MPSK) coherent demodulation is implemented, then the phase shift is quantized to L levels, where L=M if hard decision coding is desired.

If the input IF signal was created with two phase shift keying 2PSK, the phase shift is quantized to two levels, 0° and 180°, for hard decision output.

The reference generator 208 typically generates two square waves (binary signals) LO_I and LO_Q with frequencies of generally the expected IF frequency F_IF. The two signals LO_I and LO_Q are phase shifted by 90°.

The reference generator 208 typically comprises a local oscillator 216, a NOT gate 218, and two one stage counters 220 and 222. The local oscillator 216 typically produces a square wave SQ having a frequency F_LO generally of twice F_IF. One stage counter 220 produces the reference signal LO_I by dividing the frequency of SQ by two. The phase shifted reference signal LO_Q is produced by first inverting SQ (via NOT gate 218) and then dividing its frequency by 2 (by counter 222).

It is noted that if coherent modulation is utilized for the input IF signal, the reference signal LO_I must be locked to the phase of the IF signal.

The phase sensing unit 210 typically comprises a hard limiter 214, and two XOR gates 224 and 226. The hard limiter 214 limits the input analog IF signal to two values, thereby producing a binary signal. A typical hard limiter is a comparator.

The reference signals LO_I and LO_Q are XORed, via XOR gates 224 and 226 respectively, with the hard limited IF signal and the resultant XORed output signals are provided to the phase determining unit 212. The XORed signals indicate when the hard limited IF signal has the same binary value as the reference signals LO_I and LO_Q.

The phase determining unit 212 typically comprises three counters 230, 232 and 234 and a phase shift calculator 236. The counters 230–243 operate at a clock frequency F_CL which is typically N times the frequency F_IF.

The first counter 230 is a sampling counter which provides a ST_COUNT signal indicating that counting should occur. When first counter 230 reaches a count of N, it ceases providing the signal ST_COUNT at which point sampling of the data in the counters 232 and 234 occurs.

While the ST_COUNT signal is active, the second counter 232 counts the number of clock periods N1 in which the local oscillating signal has the same sign as the hard limited IF signal. N1 indicates the percentage of the time when ST_COUNT was active in which the IF signal and the reference signal LO_I have the same sign. Thus, the magnitude of the phase between LO_I and the IF signal is determined by:

$$\text{abs(phase)} = \pi(N-N1)/N \quad (1)$$

N1 only indicates the magnitude of the phase, it does not indicate whether the input IF signal is phase shifted positively or negatively with respect to the reference signal LO_I. The output of the third counter 234 provides the sign of the phase, as follows.

The third counter 234 counts the number of clock periods N2, while the ST_COUNT signal is active, in which the hard limited IF signal has the same sign as the reference signal LO_Q. For example, if the input IF signal is not phase shifted from LO_I, then N1 will equal N and N2 will equal N/2. If the input IF signal is positively phase shifted by 10%, then N1 will be 0.9N and N2 will be 0.6N. If the input IF signal is negatively phase shifted by 10%, then N1 will still be 0.9N but N2 will be 0.4N. Thus, the sign is determined as follows:

$$\text{sign(phase)} = + \text{for } N2 > N/2 \text{ } - \text{for } N2 \leq N/2 \quad (2)$$

Using equations 1 and 2, the phase shift calculator 236 determines the phase and sign between the IF signal and the reference signal from the local oscillator 216. Equation 2 can be implemented in a simpler manner, as follows:

If $N=2^q$, then bit $D_{q-1}$ from counter 234 represents the sign bit.

If $N<2^q$ and $N>2^{q-1}$ then counter 234 should be preset to the value of $2^{q-1}-N/2$. In this condition, bit $D_{q-1}$ from counter 234 represents the sign bit.

The demodulator must also determine the phase shift between consecutive samples of the IF signal. This is determined by calculator 236 as follows:

$$\text{phase\_shift} = [\text{phase}(t) - \text{phase}(t-\tau)] \bmod \pi \quad (3)$$

wherein τ is the length of time between consecutive samples and "modπ" means that if phase_shift>π then phase_shift=phase_shift−2π if phase_shift<−π then phase_shift=phase_shift+2π  (4)

If differential phase shift keying modulation was employed, then the phase shift is computed once per symbol rather than once per sample as described hereinabove.

If a hard decision is required of the demodulator, the phase calculator 236 quantizes the resultant value for the phase shift in accordance with the desired number of quantization levels. If a soft decision is required, the value of the phase shift calculated by equation 1 is provided on output.

It will be appreciated that because the hard limiter 214 and the local oscillator 216 produce binary signals, the remainder of the elements of the demodulator are digital.

In order to maximize performance and utilize the minimum power, the ratios between the modulation bandwidth, IF frequency and N should be optimized. As a rule, the IF frequency N_IF must be more than 5 times the modulation bandwidth. In order to reduce the affect of aliasing, N*F_IF must be much larger than F_IF. In order to achieve little degradation, N should be greater than 100.

It is possible to implement the present invention with a very low power clock, such as one which operates at a clock frequency F_CL of N*F_IF/K, where K is a positive integer greater than 1. In this embodiment, the resolution of the output is N, but it takes K IF cycles, rather than one cycle, to produce each sample.

If the local oscillator frequency is not exactly F_IF, the phase shift calculator 236 can compensate for the error delta_psi resulting from this mismatching of frequencies as follows:

$$\text{delta\_psi} = 2\pi(F\_IF - F\_LO\_I)\tau \qquad (5)$$

where F_LO_I is the frequency of the reference signal LO_I.

The demodulator of the present invention can also be utilized to demodulate IF signals with non-constant envelope modulation, provided that the envelope is constant during each sampling period. Examples of non-constant demodulation are MPSK and MDPSK produced with a raised cosine shaping filter.

The demodulator can also be utilized to demodulate frequency modulated signals by estimating the instantaneous frequency. This is produced in the phase calculator 236 by subtracting two consecutive phase measurements and dividing the result by $\tau$.

It will further be appreciated that the elements utilized in the demodulator of the present invention are generally simple and that the demodulator utilizes less power than those of the prior art.

For a 2PSK demodulator producing hard decisions wherein it must be determined whether the phase shift is either of 0° or 180°, only the first and second counters 230 and 232 are utilized and the local oscillator, labeled 240, provides a signal at the frequency F_IF which is locked to the IF signal. This is illustrated in FIG. 6.

Reference is now briefly made to FIGS. 7A, 7B, 7C, 7D and 7E which are circuit diagrams of an exemplary implementation of the demodulator of FIG. 5. Since the circuit diagrams are believed to be self-explanatory, in the interest of conciseness, the following discussion will be brief.

Figure 7B:
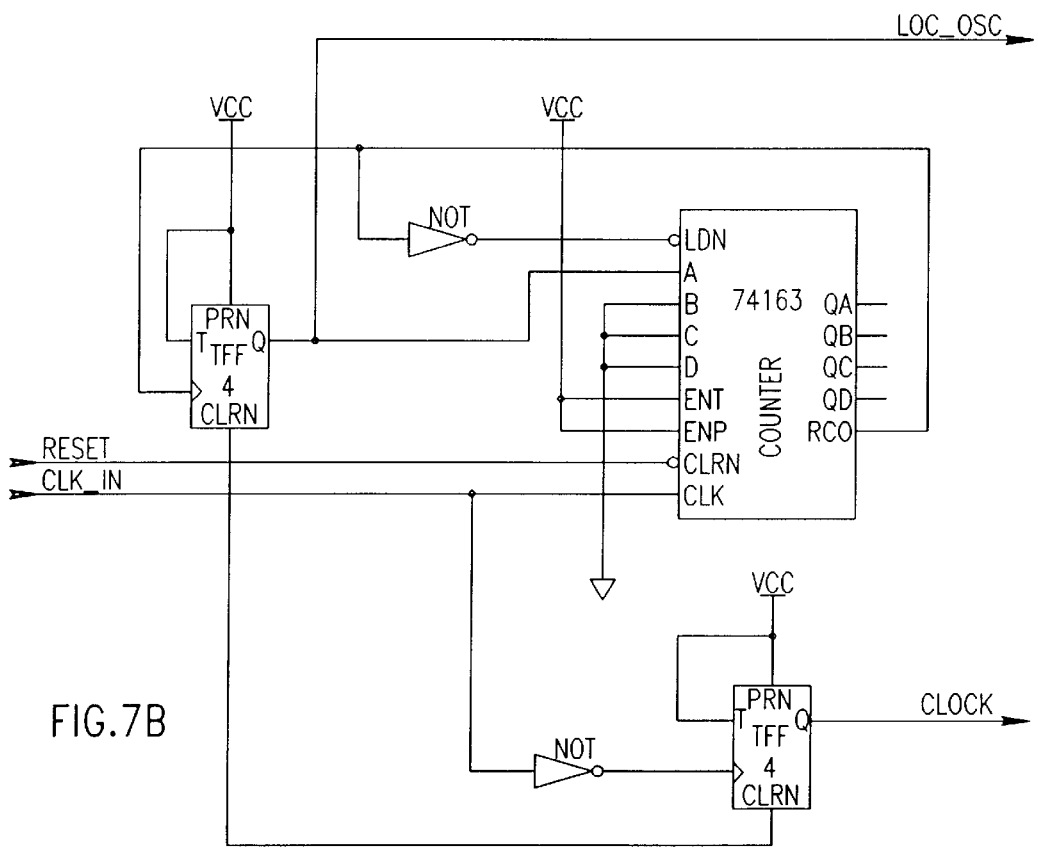
Figure 7D:
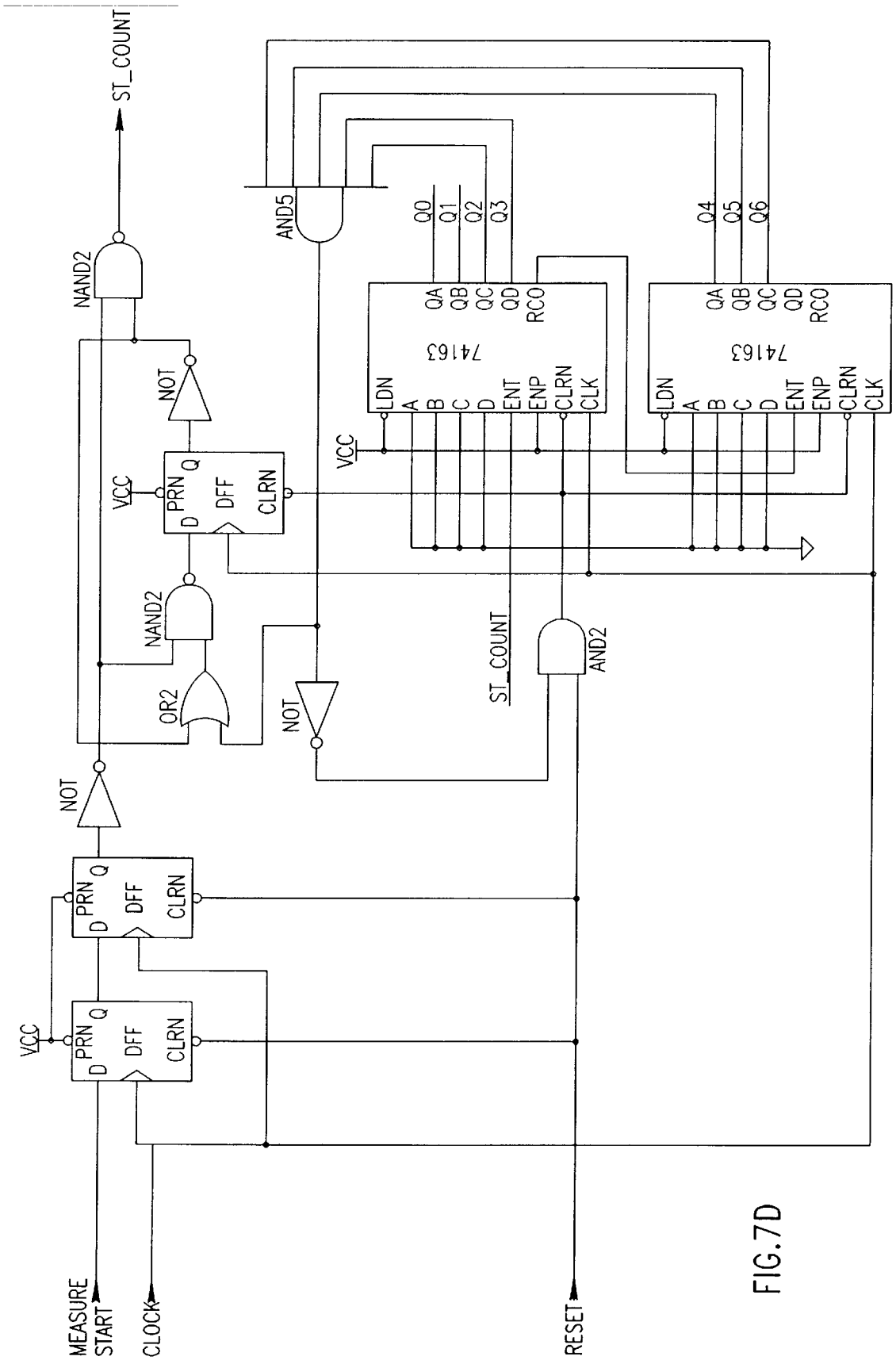

FIG. 7A illustrates the main elements, "div_clk", "lo", "time_bas" and "ph_met" which are respectively detailed in FIGS. 7B, 7C, 7D and 7E. The input signal of the circuit of FIG. 7A is an already hard-limited signal RX_IF and the output are the values N1 and N2. Thus, the hard limiter 214 and the phase shift calculator 236 are not shown in FIGS. 7A–7E. A digital signal processing chip, located outside of the circuit of FIGS. 7A–7E, implements the phase shift calculator 236.

Element div_clk provides clock signals throughout the demodulator. Element lo implements the reference generator 208. Element time$_{13}$ bas is equivalent to first counter 230 and produces the ST_COUNT signal. Element ph_met implements the XOR gates 224 and 226 had counters 232 and 234.

It will be appreciated by persons skilled in the art that the present invention is not limited to what has been particularly shown and described hereinabove. Rather the scope of the present invention is defined only by the claims which follow:

We claim:

1. A baseband processor useful in personal digital cellular (PDC) telephones having an audio front end, a radio frequency/intermediate frequency (RF/IF) module and a host microcontroller, the baseband processor comprising:

an application specific integrated circuit (ASIC) chip; and a digital signal processor (DSP) chip connected to said ASIC chip for simultaneous communication therewith, wherein said ASIC chip at least communicates directly with the RF/IF module and comprises at least digital logic chips, digital to analog conversion units and analog to digital conversion its, and wherein said DSP chip performs at least the following functions: processes control channel signals to and from said host microcontroller, processes digitized audio signals, received from said audio front end, modulation of said digitized audio signals to digitized baseband signals and partial demodulation of partially digitized baseband signals to digitized audio signals, processes said digitized baseband signals, directly receives at least one of said modulated digitized baseband signals from said ASIC chip, and directly transmits at least another of said modulated digitized baseband signals through said ASIC chip, wherein said ASIC chip converts said digitally modulated digitized baseband signals to analog modulated baseband signals for transmission by said RF/IF module, and begins partial demodulation of received analog modulated baseband signals, and wherein said digitized audio signals are received and played by said audio front end and said modulated baseband signals are transmitted and received by said RF/IF module.

2. A baseband processor according to claim 1 and wherein said DSP chip additionally comprises a digital parametrized control channel encoder and decoder.

3. A baseband processor according to claim 1 and wherein said DSP chip additionally comprises a speech channel decoder implementing a Viterbi decoding scheme and a per bit projection metric.

4. A baseband processor according to claim 1 and wherein said DSP chip comprises a digital modulator for digitally modulating a signal to be transmitted and for ramping said modulated signal.

5. A baseband processor according to claim 4 and wherein said digital modulator comprises finite impulse response filters.

6. A baseband processor according to claim 1 and wherein said DSP chip has means for performing post detection/selection, means for performing antenna selection and means for selecting between said means for performing post detection/selection and said means for performing antenna selection.

7. A baseband processor according to claim 1 and wherein said DSP chip also comprises a dual tone, multi-frequency (DTMF) indication tones generator providing indication tones to said audio front end, said indication tones generator comprising:

means for receiving operator selected pole pair values located on the unit circle; and marginally stable filters defined by said pole pair values for generating sine waves of at least one predetermined frequency.

8. A baseband processor useful in personal digital cellular (PDC) telephones having an audio front end, a radio frequency/intermediate frequency (RF/IF) module and a host microcontroller, the baseband processor comprising:

an application specific integrated circuit (ASIC) chip; and a digital signal processor (DSP) chip in connected to said ASIC chip, wherein said ASIC chip at least communicates directly with the RF/IF module and comprises at least digital logic chips, digital to analog conversion units and analog to digital conversion units, and wherein said DSP chip performs at least the following functions: processes control channel signals to and from said host microcontroller, processes digitized audio signals, received from said audio front end, modulation of said digitized audio signals to digitized baseband signals and partial demodulation of partially digitized baseband signals to digitized audio signals, processes said digitized baseband signals, directly receives at least one of said modulated digitized baseband signals from said ASIC chip, and directly transmits at least another of said modulated digitized baseband signals through said ASIC chip, wherein said ASIC chip converts said digitally modulated digitized baseband signals to analog modulated baseband signals for transmission by said RF/IF module, and begins partial demodulation of received analog modulated baseband signals, and wherein said digitized audio signals are received and played by said audio front end and said modulated baseband signals are transmitted and received by said RF/IF module, wherein said digitized baseband signals are phase modulated signals and wherein said ASIC chip comprises a phase identifier for digitally identifying phases in a hard limited IF signal.

9. A baseband processor according to 8 and wherein said DSP chip comprises at least one phase shift determiner for digitally demodulating said digitized baseband phase signal based on said digitally identified phases.

10. A device according to claim 8 wherein said phase identifier comprises a local oscillator having a frequency F_LO, wherein a hard limited input IF signal has an input frequency F_IF and wherein said phase identifier includes means for compensating when said input frequency F_IF is within a range around but not equal to F_LO.

* * * * *

UNITED STATES PATENT AND TRADEMARK OFFICE
CERTIFICATE OF CORRECTION

PATENT NO. : 5,920,593
DATED : July 6, 1999
INVENTOR(S) : Joseph Perl et al.

It is certified that error appears in the above-indentified patent and that said Letters Patent is hereby corrected as shown below:

```
On the title page, item [75], change "Doran Rainish" to --Doron
Rainish--.
```

Signed and Sealed this

Twenty-third Day of November, 1999

Attest:

Q. TODD DICKINSON

*Attesting Officer*    *Acting Commissioner of Patents and Trademarks*